(12) United States Patent
Staheli et al.

(10) Patent No.: US 6,957,761 B2
(45) Date of Patent: Oct. 25, 2005

(54) INERTIA OR FRICTION WELDING OF CONICAL COMPONENTS INTO ELLIPTICALLY-SHAPED HOLES IN A PIPE OR TUBE

(75) Inventors: William D. Staheli, North Ogden, UT (US); Gregory J. Lang, South Ogden, UT (US); Kenneth J. Clark, Morgan, UT (US); Robert E. Lewis, Westhaven, UT (US)

(73) Assignee: Autoliv ASP, Inc., Ogden, UT (US)

( * ) Notice: Subject to any disclaimer, the term of this patent is extended or adjusted under 35 U.S.C. 154(b) by 135 days.

(21) Appl. No.: 10/409,266

(22) Filed: Apr. 8, 2003

(65) Prior Publication Data

US 2004/0200883 A1 Oct. 14, 2004

(51) Int. Cl.$^7$ ............................................. B23K 20/12
(52) U.S. Cl. .................. 228/112.1; 228/113; 228/114.5
(58) Field of Search ......................... 228/112.1–114.5, 228/2.1–2.3; 156/73.5

(56) References Cited

U.S. PATENT DOCUMENTS

| | | | |
|---|---|---|---|
| 3,576,067 A | | 4/1971 | Loyd et al. |
| 3,597,832 A | * | 8/1971 | Calton et al. ................ 228/113 |
| 3,633,599 A | * | 1/1972 | Roos ........................ 137/15.13 |
| 4,063,676 A | * | 12/1977 | Lilly ............................ 228/114 |
| 4,087,038 A | | 5/1978 | Yagi |
| 4,260,094 A | * | 4/1981 | Stroo ........................ 228/112.1 |
| 4,331,280 A | * | 5/1982 | Terabayashi et al. .... 228/114.5 |
| 4,756,465 A | * | 7/1988 | Pranch et al. ................ 228/115 |
| 4,820,225 A | | 4/1989 | Thompson-Russell et al. |
| 4,850,772 A | | 7/1989 | Jenkins |
| 5,271,287 A | * | 12/1993 | Wadleigh ...................... 74/439 |
| 5,297,719 A | * | 3/1994 | Cremerius .................. 228/114 |
| 5,519,182 A | * | 5/1996 | Linzell .................... 219/117.1 |
| 5,908,044 A | * | 6/1999 | Kearns et al. ........... 137/15.16 |
| 6,095,395 A | * | 8/2000 | Fix, Jr. ........................ 228/2.3 |
| 6,189,926 B1 | | 2/2001 | Smith |
| 6,199,916 B1 | * | 3/2001 | Klinger et al. ........... 285/288.1 |
| 2004/0089342 A1 | * | 5/2004 | Vennemann et al. ........ 137/317 |
| 2004/0200883 A1 | * | 10/2004 | Staheli et al. ............ 228/112.1 |

FOREIGN PATENT DOCUMENTS

| | | |
|---|---|---|
| DE | 27 40 742 | 3/1978 |
| EP | 0 375 591 | 1/1994 |
| EP | 0 681 948 A1 | 3/1995 |
| EP | 0 681 946 A1 | 11/1995 |

OTHER PUBLICATIONS

Pavey et al. "Aspects of the Use of Conical Joints for Friction Welding Applications," Welding, IPC Science and Technology Press LTD., Haywards Heath, GB, vol. 40, No. 6, pp. 220-224, Jun. 1972.

* cited by examiner

Primary Examiner—Kiley S. Stoner
(74) Attorney, Agent, or Firm—Sally J. Brown

(57) ABSTRACT

A method of joining tubular structures using friction welding is disclosed. The invention provides a method of joining a first tubular structure having a conical contact surface to a second tubular member with an elliptical contact orifice by placing the conical surface within the contact orifice, rotating one of the structures, and pressing them together to form a weld. The invention further discloses airbag inflators constructed using the method of the invention.

56 Claims, 5 Drawing Sheets

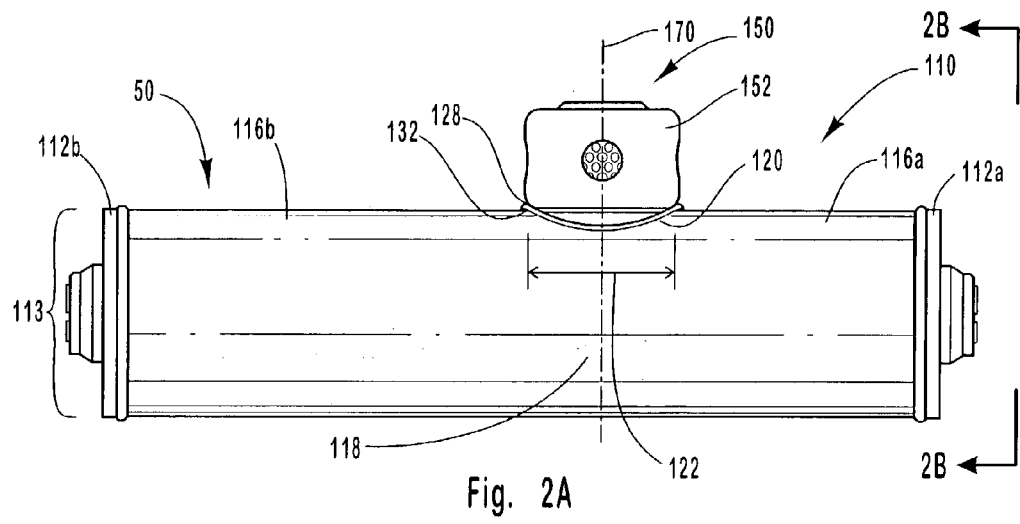
Fig. 2A
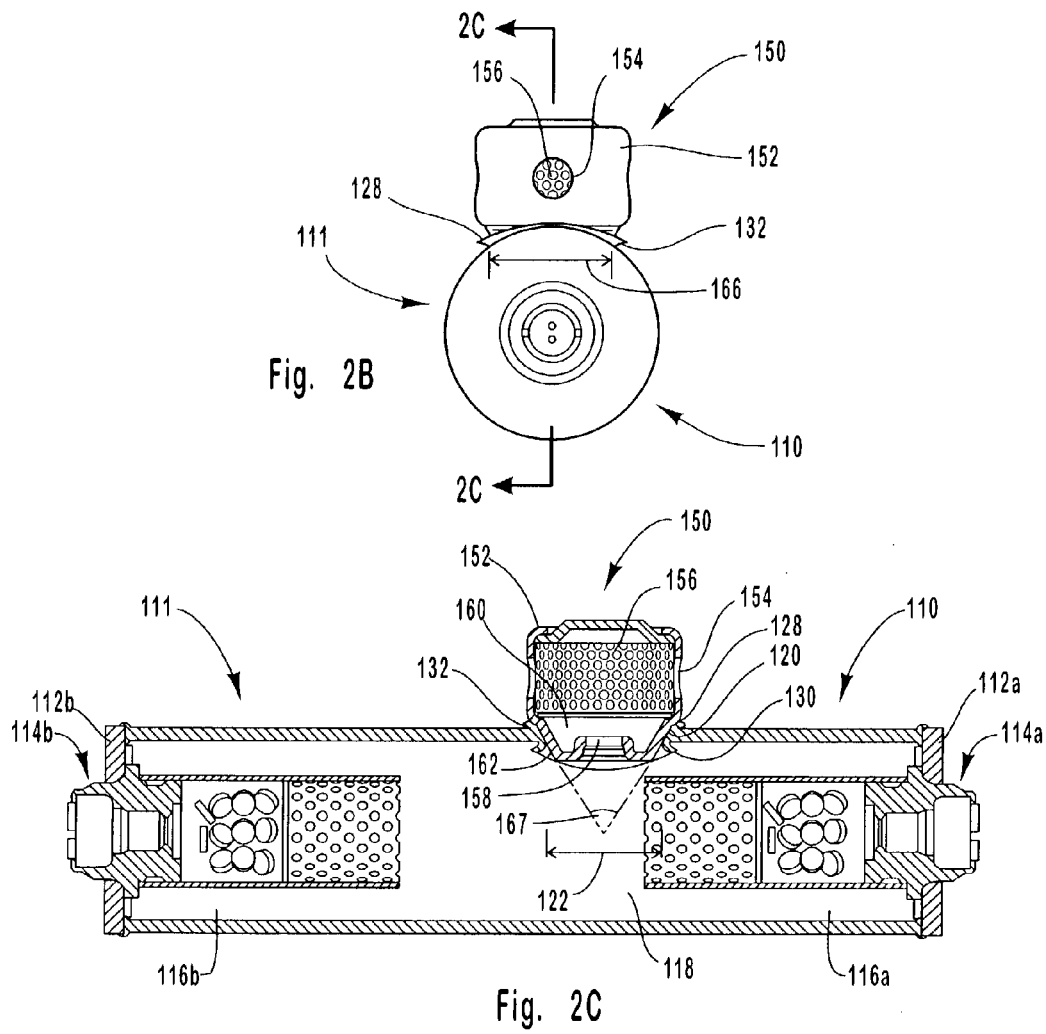
Fig. 2B
Fig. 2C

INERTIA OR FRICTION WELDING OF CONICAL COMPONENTS INTO ELLIPTICALLY-SHAPED HOLES IN A PIPE OR TUBE

BACKGROUND OF THE INVENTION

1. Field of the Invention

The present invention relates to methods of inertial welding. More specifically, the present invention relates to inertial welding methods for attaching a conical component to a side of a pipe or tube.

2. Description of Related Art

Friction welding is a technology used to join metal or other thermoplastic components using heat generated by friction between the components. This technology is often used to join a tube, solid rod, or other symmetrical object to another component. Generally, the needed friction between the parts is obtained by rotating one part and pressing it against the other, which is held stationary. The heat generated by the resulting friction softens the material of the parts, and the softened materials may then be forced together and allowed to become rigid, thus forming a stable weld.

This general method is commonly used to weld a tube or pole to a flat surface, to weld two poles or tubes end-to-end, and to create butt joints. In friction welding, the part being rotated is generally substantially symmetrical, and is rotated about its axis of symmetry. This provides stability during the rotation of the part. In addition, the face of the part being rotated and the receiving face of the other part are generally flat, planar surfaces such that when placed in contact, there is a constant interface between the rotating part and the surface to which it is being joined. The part being rotated may be solid, such as a metallic rod, or may be hollow, such as a metal pipe or tube. Both of these configurations yield a stable rotation and a constant interface between the rotating part and the weld surface.

The non-rotating part to which the substantially symmetrical component is being welded may also be symmetrical, as when two rods or tubes are being joined end-to-end. Alternatively, the components may be asymmetrical. For example, the receiving component may simply include a flat surface to which a rotatable component is to be joined. Alternatively, the receiving component may include an aperture against which the rotatable part is pressed. In most applications, it is important that the surface of the receiving component be relatively flat, and thus be conducive to being aligned substantially parallel to the surface of the part to be welded. This further helps to provide a constant interface between the rotating part and the receiving part, thus encouraging the formation of a secure weld.

Mathematical models have been generated which are used to determine the rotational speed which must be imparted to the rotatable member and the pressure with which it must be pushed against the stationary component in order to generate sufficient heat to yield a proper weld. These models have been produced for a variety of welding applications and situations. In some friction welding methods, the rotatable component is rotated using a motorized assembly to provide a predetermined velocity and pressure. In other friction welding methods, the rotatable part is coupled to a flywheel of a predetermined size which is brought up to a specified velocity and pressed against the stationary piece at a predetermined pressure. This family of methods is referred to as inertial welding. Both methods operate using substantially the same principles.

In these methods, the parts to be welded are first aligned such that the surfaces to be joined are substantially parallel. The part to be rotated is then rotated at a specific speed and pressed against the opposite surface with a predetermined pressure. The contact and rotation of the parts generates sufficient heat to render plastic the material of the parts at their interface. As the material of the stationary and rotating components begins to become plastic, the rotation of the parts sweeps outward some of the material at the interface of the two components. This action helps to compensate for a less-than optimal interface by removing detrimental surface features. It also rids the interface of oxidized materials or impurities that could weaken the weld. The material driven from the interface builds up and cools about the weld, forming a structure called a "weld flash" about the interface of the two components. The weld flash is desirably uniformly distributed about the joint, and provides a smooth, aesthetically-acceptable surface at the weld.

The relatively flexible parameters of friction welding and the aesthetic results of the process have made frictional welding a popular and useful technique for joining metal components. As briefly noted above, however, this technique has largely found successful use in applications requiring the creation of butt joints, the coaxial fusion of tubes or poles, and the fusion of a tube or pole to a flat surface. Some designs call for the fusion of two tubular objects oriented substantially perpendicularly such that a first tubular object is to be fused into the rounded side surface of the other tubular object. One example of this is applications requiring the attachment of a tube into the side of another tube to form a T-joint. This type of weld is incompatible with existing friction welding methods since the attachment face of the receiving part is not planar, resulting in uneven contact, heating, and plasticity.

As a result, objects requiring such construction must be assembled using alternate casting or machining methods which are generally expensive and which may add production time and difficulty to the creation of the object. These alternative methods may further result in a product having a longer production time, higher cost, and more complex design.

SUMMARY OF THE INVENTION

The method of the present invention has been developed in response to the present state of the art, and in particular, in response to the problems and needs in the art that have not yet been fully solved by currently available inertial welding methods. Thus, the present invention provides a method for welding a conical component into an elliptically-shaped hole in the wall of a pipe or tube. In one specific embodiment, the present invention provides a method of welding an outlet port into a tubular airbag inflator body to form an airbag inflator.

A first step of the method of the invention is to provide a first tubular structure having a conical contact face. In one embodiment, the tubular structure is an outlet port for an airbag inflator. This first tubular structure is generally symmetrical and has an axis of symmetry about which it may be rotated.

A next step of the methods of the invention is to provide a second tubular structure having a contact orifice for receiving the first tubular structure. In some embodiments of the methods, the second tubular structure is an airbag inflator body or other similar tubular structure.

The contact orifice of the second tubular structure is generally positioned on a rounded outside face of the second tubular structure. As a result, the contact orifice is generally elliptical in shape, and is defined by a major diameter and a minor diameter. The major diameter of the elliptical contact orifice of the second tubular structure is generally positioned in a single plane along the surface of the second tubular structure. If the second tubular structure is an elongated symmetrical tube, the major diameter is generally placed substantially parallel to the axis of symmetry. The minor diameter is positioned substantially perpendicular to the major diameter. As a result, the minor diameter travels through the interior of the tubular structure rather that strictly along its surface like the major diameter. In alternate embodiments of the invention, the contact orifice may be placed on a flattened portion of the second tubular structure. This results in a contact orifice which is circular when the flattened region is as wide as or wider than the outlet port, and a partially-circular, partially-elliptical shape when the flattened region is narrower than the outlet port.

Having provided these components, a next step of the method is to align the components such that the conical contact face of the first tubular structure is directed into the elliptical contact orifice of the second tubular structure. This generally aligns the two structures in a substantially perpendicular manner, and results in the conical contact face contacting the elliptical contact orifice as the structures are brought together.

Following proper alignment of the two structures, the first tubular structure is rotated about its axis of symmetry. The speed of rotation may be selected to provide sufficient energy to the rotating part to generate sufficient friction to soften the parts enough to form a weld. The rotating part is then pressed against the second tubular structure, which is held stationary. The pressure further helps to generate the friction, and to provide a weld once softening has occurred. The friction created at the contact faces of the first and second tubular structures generates heat, rendering the contact surfaces plastic. The plastic surfaces then form a weld, uniting the first and second tubular structures.

In some embodiments, the method uses a single set of rotation and pressure steps to create the weld. In these embodiments, the first tubular structure is rotated at a speed of from about 6500 rpm to about 11000 rpm. The first tubular structure is pressed against the second with a pressure of from about 900–1200 psi. In alternate embodiments, the method of the invention uses a two-step method in which the first tubular structure is first rotated at an outset rate and placed in contact with the second structure at an onset pressure. After a period of time, the rate of rotation is changed to a weld rate, and the pressure to a weld pressure. In these embodiments, the onset rate of rotation varies from about 6350 rpm to about 9925 rpm. The onset pressure is generally from about 300 psi to about 360 psi. During the second step in these embodiments, the weld rotation rate is from about 6000 rpm to about 9500 rpm. The weld pressure during the second step is from about 1000 psi to about 1200 psi.

In certain embodiments of the invention, a final step involves holding the two structures in place in order to allow the weld to cure. This step generally includes holding the structures in place for a period of at least about 0.5 seconds. This step generally lasts from about 0.5 to about 2 seconds.

The invention further includes airbag inflators produced using the methods of the invention. The airbag inflators of the invention include inflators having an outlet port and a tubular inflator body joined by the friction welding techniques of the invention.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which:

FIG. 2A is a perspective view of a second embodiment of an airbag inflator assembled using the friction welding methods of the invention;

FIG. 2B is a an end view of the assembled airbag inflator of FIG. 2A;

FIG. 2C is a longitudinal cross-sectional view of the assembled airbag inflator of FIG. 2A taken along line 2C—2C of FIG. 2B;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the method and apparatus of the present invention, as represented in FIGS. 1A through 3, is not intended to limit the scope of the invention, as claimed, but is merely representative of presently preferred embodiments of the invention.

Friction welding generally provides high-quality welds, and is very susceptible to use in assembly-line manufacturing. Additionally, friction welding methods such as the methods of the invention provide welds having aesthetically-pleasing and smooth weld flashes, thus avoiding the need for additional processing after welding.

Herein, the term "friction welding" is used to denote a process by which metallic or thermoplastic objects are joined by creating friction between them to generate heat and soften the objects sufficiently to form a weld. In some applications, friction is generated between the objects by rotating one object relative to the other and pressing them together. Further, the term "inertial welding" is used to describe a form of friction welding in which a flywheel or other equivalent device is used to provide kinetic energy which is directed to weld the two thermoplastic members together.

The present invention provides methods for friction welding a tubular structure with a conical contact surface to an orifice placed in the side of a second tubular structure. These methods involve rotating the first tubular structure and pressing it into the orifice of the second structure to cause it to form a weld. In some of the methods of the invention, the orifice is substantially elliptical in shape. In others, the orifice is placed into a flattened region of the second tubular structure, resulting in an orifice having a constant radius, and thus in some regions, a circular geometry in addition to the elliptical regions.

The methods of the invention are useful in many contexts. For example, the methods are useful in fusing components such as outlet ports into airbag inflators. The invention further includes airbag inflators constructed using the methods of the invention. Finally, the invention further includes methods of constructing airbag inflators using the friction welding methods disclosed herein.

Figure 1A:
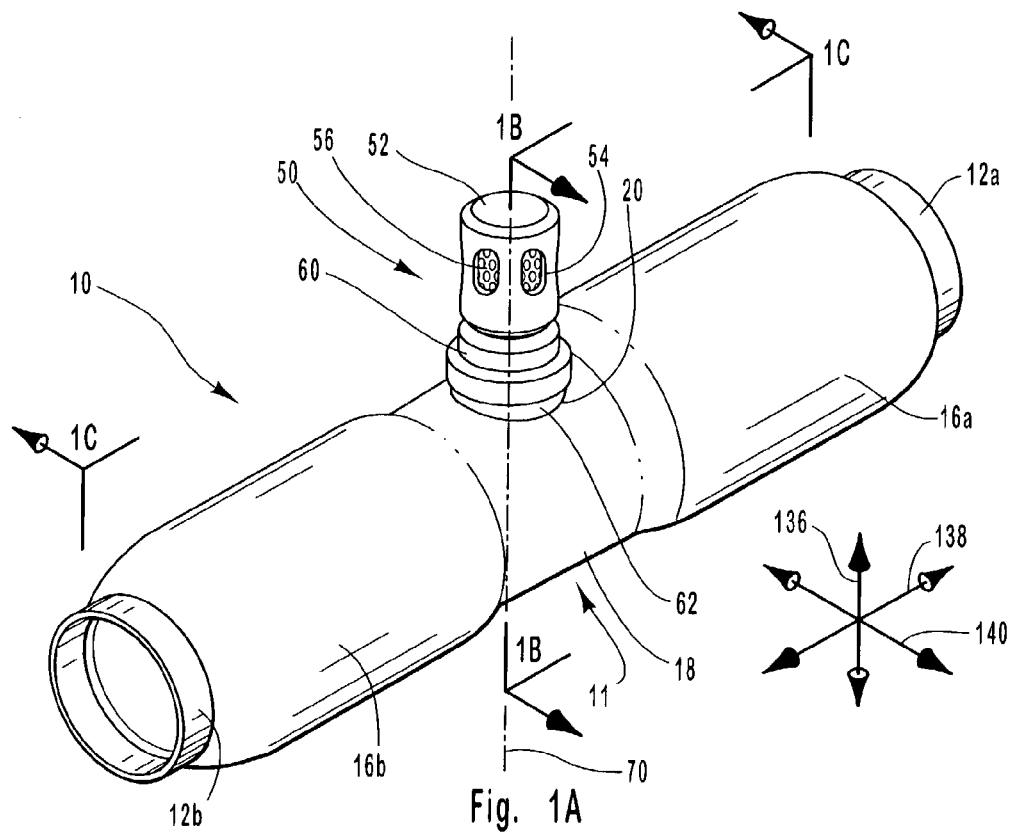
FIG. 1A is a perspective view of a first embodiment of an airbag inflator capable of being assembled using the friction welding methods of the invention.

Although useful in many other settings, the methods of the invention will be discussed herein with reference to airbag inflators constructed using the methods. Thus, referring first to FIG. 1A, a perspective view of components of an airbag inflator 10 capable of being assembled using the friction welding methods of the invention is shown. In FIG. 1, the airbag inflator 10 is shown with the outlet port 50 placed in abutment to the inflator body 11. This is the alignment of the parts 11, 50 prior to being welded using the method of the invention. The inflator 10 is composed of an inflator body 11 having gas chambers 16a, 16b that are connected by a central chamber 18 and capped by end caps 12a, 12b. The inflator body 11 further includes an elliptical outlet orifice 20 into which the outlet port 50 may be welded using the methods of the invention. This weld would be visible as an external weld flash. The inflator 10 is configured to hold a pressurized gas, mixture of gases, gas generant, or other compound or system for providing an inflation gas for an inflatable airbag (not shown). Further, the inflator 10 is configured to controllably release that inflation gas to inflate an airbag.

The outlet port 50 is shown to include an outlet housing 52 comprising outlet orifices 54. The outlet housing 52 may enclose a diffuser 56. The housing 52 is attached to a port body 60 having a conical contact surface 62. The conical contact surface 62 of the outlet port 50 contacts the elliptical outlet orifice 20 of the inflator body 11 during the welding process of the invention.

Figure 1B:
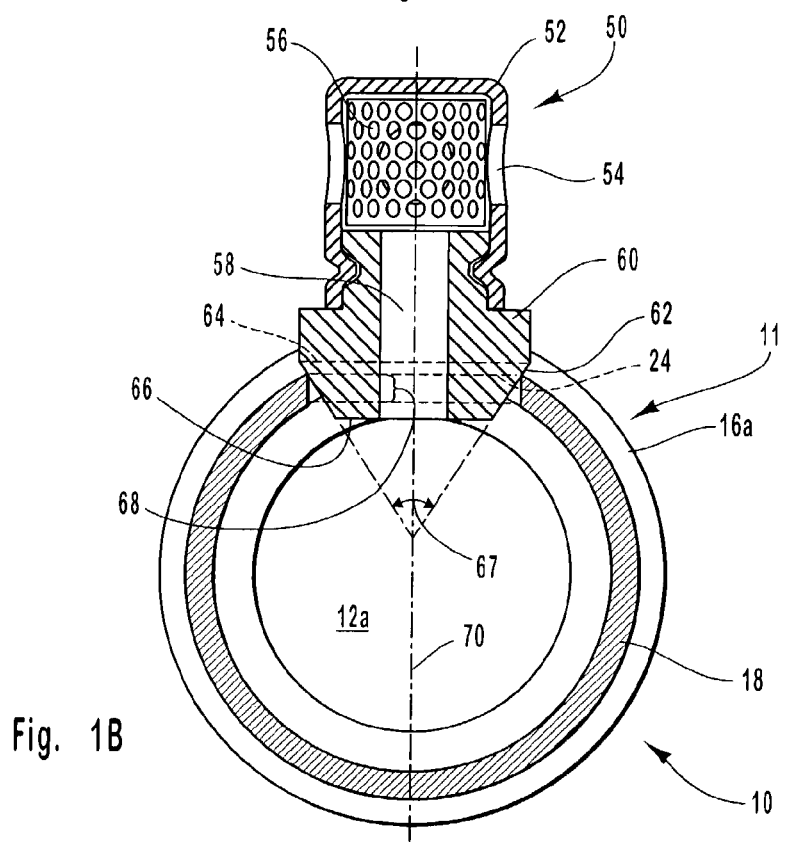
FIG. 1B is a lateral cross-sectional view of the airbag inflator of FIG. 1A taken along line 1B—1B of FIG. 1A.

FIG. 1B is a lateral cross-section view of the inflator 10 of FIG. 1A taken at line 2A—2A of FIG. 1A. FIG. 1B shows the outlet port 50 placed into abutment with the inflator body 11 as it would be positioned for welding prior to its attachment to the inflator body 11. FIG. 1B thus serves as an illustration of the configuration of the components prior to subjecting them to the welding method of the invention.

The view of FIG. 1B first shows the outlet port 50 in a cross-sectional view. The outlet port 50 comprises a port body 60 which is a substantially rigid member having a conical contact surface 62. The port body 60 is a generally tubular structure, including an outlet passage 58 that allows gas to pass from the inflator body 11 into the outlet port 50. The outlet passage 58 is continuous with the outlet housing 52 of the outlet port 50, which is attached to the port body 60. The outlet housing 52 features at least one outlet orifice 54 for releasing gas transmitted through the outlet passage 58 into the surrounding environment. The outlet port 50 may additionally include a diffuser 56 for regulating the flow of exiting gas.

The outlet port 50 is shown to be configured to be attached to the inflator body 11 at the elliptical outlet orifice 20. Specifically, the outlet port is shown having a conical contact surface 62 which interfaces with the elliptical outlet orifice 20. This conical contact surface 62 has an included angle 67. The included angle 67 is an angle which may be large, resulting in a relatively flat conical contact surface 62, or small, resulting in a very steep conical contact surface 62. In some embodiments, the included angle 67 is an angle of from about 30 degrees to about 90 degrees. In some presently-preferred embodiments, the included angle is from about 60 degrees to about 90 degrees.

The conical contact surface 62 varies in diameter 53 over its height. Specifically, the conical contact surface 62 has a diameter 63 ranging from a large diameter 64 to a narrow diameter 66. The conical contact surface 62 contacts the elliptical outlet orifice 20 of the inflator body 11 over a range of its surface referred to as the contact face 68.

The contact face 68 is a region which contacts the edges of the elliptical contact orifice 20 when the outlet port 50 is inserted into the inflator body 11. When stationary, the contact face 68 is a substantially linear region of the conical contact surface 62. When rotating, the contact face 68 is a band positioned about the conical contact surface 62. This region forms the weld 32 during the method of the invention.

FIG. 1B further shows the inflator body 11 which attaches to the outlet port 50. The inflator body 11 includes an elliptical outlet orifice positioned in a narrowed central chamber 18 and a gas chamber 16a that is closed and sealed with an end cap 12a. The narrowed central region 18 allows use of a smaller elliptical outlet orifice 20, and thus a smaller region over which to form the weld 32. The inflator body 11 may alternatively have a uniform size, omitting the narrowed central chamber 18. FIG. 1B also shows the geometry of the elliptical outlet orifice 20. Specifically, FIG. 1B shows the minor diameter 24 of the elliptical outlet orifice 20. This minor diameter 24 may be obtained and positioned by projecting the outlet port 50 against the end of the inflator body 11 at the height at which the outlet port 50 is desired to be placed. The minor diameter 24 obtained also generally corresponds to a small diameter 66 of the outlet port 50 reflecting an approximate lower boundary of the contact face 68.

Figure 1C:
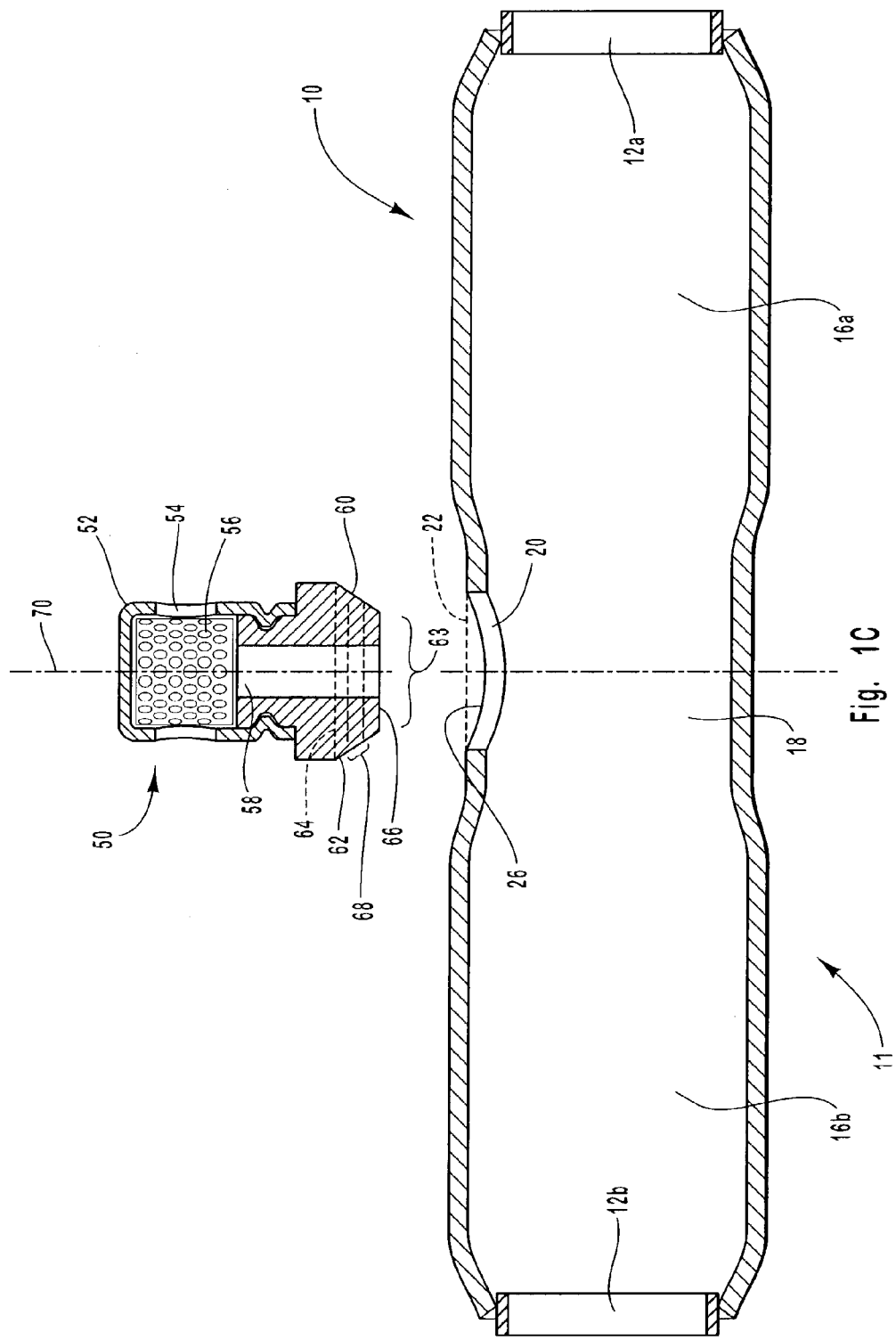
FIG. 1C is a longitudinal cross-sectional view of the airbag inflator of FIG. 1A taken along line 1C—1C of FIG. 1A with the outlet port shown separated from the inflator body.

Referring now to FIG. 1C, yet another view of the inflator 10 of FIG. 1A is shown. Specifically, FIG. 1C shows the inflator 10 of FIG. 1A in a longitudinal cross-sectional view taken at line 1C—1C of FIG. 1A. In this Figure, the outlet port 50 is shown separated from the inflator body 11. As above, the inflator 10 is shown to comprise an inflator body 11, and an outlet port 50.

The inflator body 11 of the inflator 10 has gas chambers 16a, 16b connected by a narrowed central chamber 18, as seen in the above Figures. Similarly, as above, the inflator body 11 further includes an elliptical outlet orifice 20 to receive the outlet port 50. FIG. 1C further clarifies the geometry of the elliptical outlet orifice 20. Specifically, FIG. 1C shows the major diameter 22 of the elliptical outlet orifice 20. This major diameter 22 may be obtained and positioned by projecting the outlet port 50 against the side of the inflator body 11 at the height at which the outlet port 50 is desired to be placed. The major diameter 22 obtained also generally corresponds to large diameter 68 of the outlet port 50 reflecting an approximate upper boundary of the contact face 68.

As above, the inflator 10 further includes an outlet port 50 having an outlet passage 58 continuous with interior of the inflator body 11 when attached to the inflator body 11. The outlet passage 58 travels through the port body 60 and terminates in the outlet housing 52. Gases passing through the passage 58 may then exit through outlet orifices 54. In some embodiments, the outlet port 50 also includes a diffuser 56 through which gases must pass prior to exiting through the outlet orifices 54. The outlet port 50 also includes a conical contact surface 62 that interfaces with the elliptical outlet orifice 20 of the inflator body 11. As discussed above, the conical contact surface 62 has a diameter 63 that varies from a large diameter 64 to a small diameter 66.

Referring now to FIG. 2A, a second embodiment of an inflator 110 constructed using the method of the invention is shown. As above, the inflator 110 includes an inflator body 111 and an outlet port 150. The inflator body 111 is here a tubular component having a substantially uniform diameter 113 with ends sealed with end caps 112a, 112b. The inflator body 111 may include gas chambers 116a, 116b and a connecting chamber 118. These chambers 116a, 116b, 118 may be partitioned or may be continuous with each other. As in FIGS. 1A–1C, the inflator body 111 also includes an elliptical outlet orifice 120 provided in an outside surface of the inflator body 111. The orifice 120 may be cut, machined, punched, or otherwise provided in the inflator body 111.

The outlet port 150 illustrated in FIG. 2A is wider than outlet port 50 of FIGS. 1A–1C. The outlet port 150 has an outlet port housing 152 with outlet orifices 154. The outlet port 150 may additionally include a diffuser 156. Port 150 has a conical contact surface 162 defined by an internal angle 167 (shown in FIG. 2C) that is larger in this embodiment than the internal angle 67 of FIGS. 1A–1C. The outlet port 150 is also wider than the outlet port 50 of FIGS. 1A–1C, having a large diameter 164 and a small diameter 166. The port 150 is configured to be set low into the inflator body 111. To facilitate this, the inflator body 111 includes an elliptical orifice 120 wider than 20 of FIGS. 1A–1C. The elliptical orifice 120 has a minor diameter 124 shown in FIG. 2B, as well as a major diameter 122 shown in FIG. 2C. These diameters may be determined by positioning the port 150 at its desired height adjacent to the inflator body 111 and projecting the port 150 against the inflator body 111. The distance between the points of intersection of the port 150 with the inflator body 111 is the diameter.

FIG. 2B shows an end view of the inflator 110 of FIG. 2A made using the welding method of the invention. The view of FIG. 2B is shown by line 2B—2B of FIG. 2A. Both FIG. 2B and FIG. 2C help to show the characteristics of the weld 132 holding the port 150 and the inflator body 11 together. Specifically, in both FIGS. 2B and 2C, the inflator 110 is seen to include a weld 132. The weld 132 has an external weld flash 128 and an internal weld flash 130 made up of thermoplastic material shed from the interface between the outlet port 150 and the contact edge (not shown, similar to 26 of FIG. 2C) of the elliptical outlet orifice 120.

The weld 132 is formed at the interface of the contact edge (not shown) of the elliptical outlet orifice 120 and the conical contact surface 162 of the outlet port 150. As shown in FIG. 2C, the conical contact surface 162 is a substantially smooth surface which is placed into contact with the contact edge (not shown) of the elliptical outlet orifice 120 during the welding method of the invention. The conical contact surface 162 is defined by an included angle 167. The included angle 167 of the conical contact surface 162 may be varied widely within the scope of the invention. In some embodiments, the included angle 167 may be from about 30 degrees to about 90 degrees. In other embodiments, the included angle 167 may be from about 60 degrees to about 90 degrees.

In FIG. 2C, the inflator 110 is shown in a longitudinal cross-section view taken at line 2C—2C of FIG. 2B. As in FIGS. 2A and 2B above, the inflator 110 includes an inflator body 111 having gas chambers 116a and 116b and a connecting chamber 118 and an outlet port 150. The inflator body 111 is sealed with end caps 112a, 112b which include initiator assemblies 114a, 114b. The inflator body 111 includes an elliptical outlet orifice 120 provided in an outside surface of the inflator body 111. FIG. 2C illustrates a major diameter 122 of the outlet orifice 120. As above, the outlet port 150 is attached to the inflator body 111 by a weld 132 between the outlet orifice 120 and the conical contact surface 162.

Figures 2D, 2E:
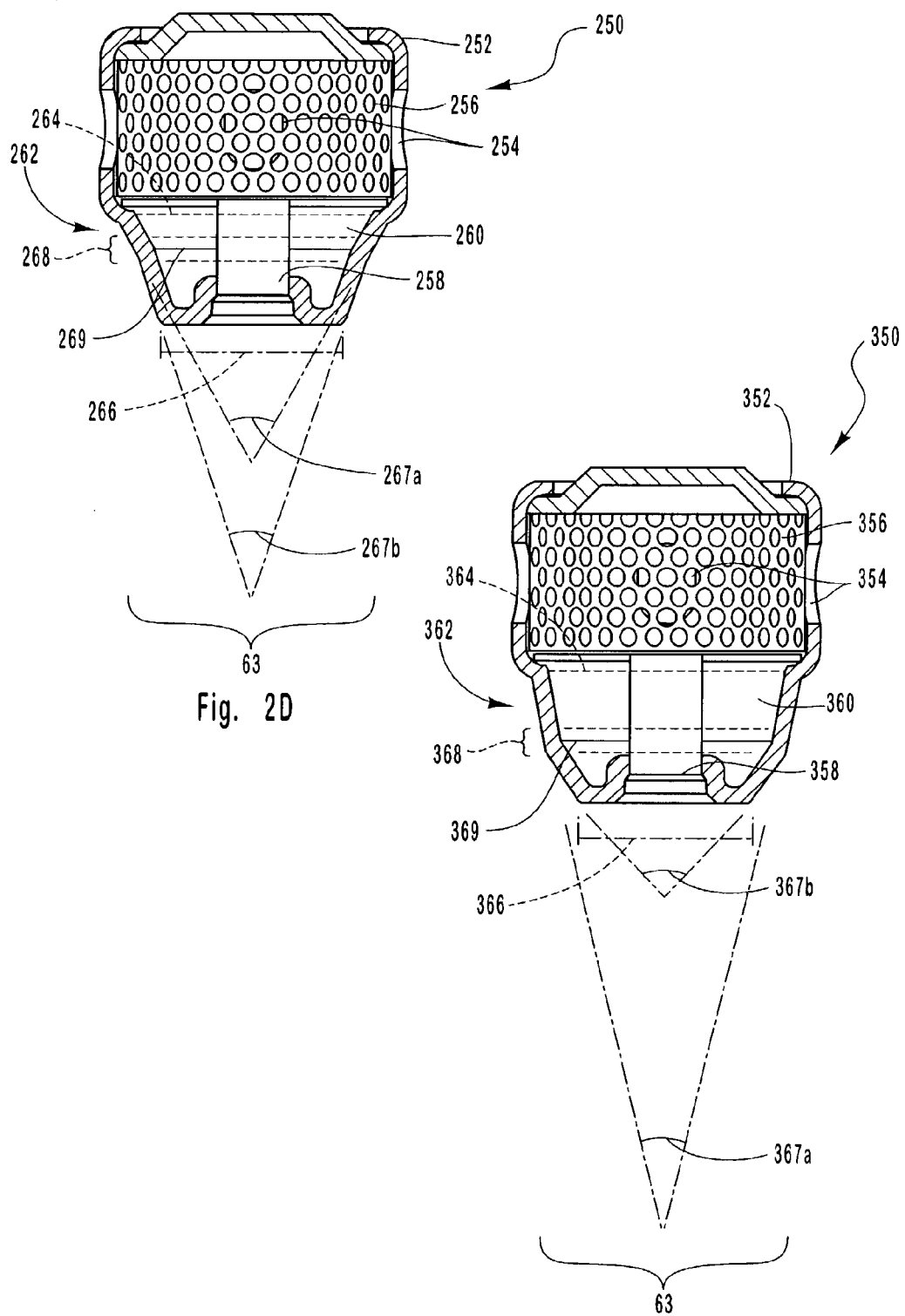
FIG. 2D is an isolated cross-sectional view of an alternative embodiment of the outlet port of the airbag inflator of FIG. 2A.
FIG. 2E is an isolated cross-sectional view of an alternative embodiment of the outlet port of the airbag inflator of FIG. 2A.

In some embodiments of the invention, the conical contact surface 162 of the outlet port 150 is defined by a single included angle 167. In alternative embodiments of the invention, the conical contact surface 162 of the outlet port 150 is defined by multiple included angles. A first embodiment of such an outlet port 250 is shown in FIG. 2D. As in the previously-described outlet ports 50, 150 of the invention shown in FIGS. 1A–1C and 2A–2C, respectively, the outlet port 250 includes an outlet housing 252 and a port body 260. The outlet housing 252 includes outlet orifices 254, and is attached to the port body 260. The port body 260 has an outlet passage 258 and a conical contact surface 262. The conical contact surface 262 has a large diameter 264 and a small diameter 266. The conical contact surface 262 of this outlet 250 is defined in this embodiment by a first included angle 267a and by a second included angle 267b. The conical contact surface 262 here includes a transition 269 generally positioned in the contact face 268 of the contact surface 262 at which the defining included angle 267a, 267b is switched.

In the outlet port 250 of FIG. 2D, the contact surface 262 transitions from a wide included angle 267a to a narrower included angle 267b. In this embodiment, this results in a transition 269 which is a joint between a first portion of the conical contact surface 262 defined by the first included angle 267a and a second portion of the conical contact surface 262 defined by the second included angle 267b. In this embodiment, the portion of the conical contact surface 262 defined by the first included angle 267a slopes gradually. After the transition 269, however, the conical contact surface 262 slopes more steeply where it is defined by the second included angle 267b.

A second embodiment of an outlet port 350 having a conical contact surface 362 defined by multiple included angles 367a, 367b is shown in FIG. 2E. As in the previously-described outlet ports 50, 150, 250 of the invention shown in FIGS. 1A–1C and 2A–2D, respectively, the outlet port 350 includes an outlet housing 352 and a port body 360. The outlet housing 352 includes outlet orifices 354, and is attached to the port body 360. The port body 360 has an outlet passage 358 and a conical contact surface 362. The conical contact surface 362 has a large diameter 364 and a small diameter 366. The conical contact surface 362 of this outlet 350 is defined in this embodiment by a first included angle 367a and by a second included angle 367b. The conical contact surface 362 here includes a transition 369 generally positioned in the contact face 368 of the contact surface 362 at which the defining included angle 367a, 367b is switched.

In the outlet port 350 of FIG. 2E, the contact surface 362 transitions from a narrow included angle 367a to a significantly wider included angle 367b. This results in a transition 369 which is a joint between a first portion of the conical contact surface 362 defined by the first included angle 367a and a second portion of the conical contact surface 362 defined by the second included angle 367b. In this embodiment, the portion of the conical contact surface 362 defined by the first included angle 367a slopes steeply. After the transition 369, however, the conical contact surface 362 slopes more gently where it is defined by the second included angle 267b.

The welding methods of the invention may be employed to attach the outlet port 50 to the inflator body 11 of the inflator 10 by forming a weld 30 as shown in FIG. 1A. Specifically, the inflator 10 of FIGS. 1A, 1B, and 1C is welded using the method of the invention of joining a first tubular structure, here the outlet port 50, to a second tubular structure, here the inflator body 11. The steps of this method will be discussed in detail hereafter.

The friction welding method of the invention generally includes the steps of providing a first component having a conical surface to be welded to a second component having an elliptical orifice placed in a tubular region of the second component. In this embodiment of the method of the invention, the outlet port 50, with its conical contact surface 62, is the first component. The inflator body 11, with its elliptical contact orifice 20, is the second component. According to the method of the invention, the orifice 20 may be provided using punching or stamping technologies known in the art.

The outlet port component 50 generally has a first axis of symmetry 70 shown in FIGS. 1A–1C. The outlet port 50 may be rotated about this axis 70. Referring now to FIGS. 1A, 1B, and 1C, the outlet port 50 has an axis of symmetry 70 passing through the center of the port component 50. This axis of symmetry 70 provides a stable axis of rotation for the outlet port 50 during the following steps of the method of the invention.

The inflator body component 111 is generally tubular in structure, and has an elliptical contact orifice 20. This elliptical contact orifice 20 is generally defined by a minor diameter 24 and a major diameter 22, shown in FIGS. 1B and 1C, respectively. The inflator body 111 is not necessarily symmetrical.

In some methods of the invention, the conical contact face 62 of the outlet port 50 has a diameter 63 shown in FIG. 1C which ranges from a maximum size 64 at least as large as the major diameter 22 of the elliptical contact orifice 20 to a minimum size 66 smaller than the minor diameter 24, while remaining at least as large as the minor diameter 24 of the elliptical contact orifice 20. According to the method of the invention, the major and minor diameters 22, 24 of the elliptical contact orifice 20 of the inflator body 11 may be determined by projecting the outlet port 50 against a side and an end of the inflator body 11 at the desired height of the outlet port 50.

Having provided two components 50, 11 suitable for welding according to the method of the invention, in a next step, the first and second components, here the outlet port 50 and the inflator body 11, respectively, are aligned such that the outlet port 50 enters the elliptical outlet orifice 20 and the conical contact surface 62 is in contact with the edge 26 of the elliptical outlet orifice 20. In this alignment, the axis of symmetry 70 of the outlet port 50 is perpendicular to the major diameter 22 of the elliptical contact orifice 20.

Following this alignment step, one of the two components 50, 11 is rotated about the axis of symmetry 70 of the outlet port 50, and the outlet port 50 is pressed against the inflator body 11 to form a weld 132, shown in FIG. 2A. Referring again to FIGS. 1A–1C, the outlet port 50 is generally rotated about its axis of symmetry 70 and pressed against the inflator body 11. After a weld such as 132 of FIG. 2A has formed, the rotation of the components 11, 50 is ceased, and the structures 11, 50 are retained in place to allow the weld 132 to cure.

In some methods of the invention, the step of rotating one of the components 50, 11 about the axis of symmetry 70 of the outlet port 50 includes rotating the outlet port 50 about the axis of symmetry 70. These methods generally further include the step of retaining the inflator body 11 in a fixed position while the outlet port 50 is being rotated. In those methods including the step of rotating one of the tubular structures 60, 11 about the axis of symmetry 70 of the outlet port 50, the speed of rotation may be from about 6500 rpm to about 11,000 rpm. Alternatively, the speed of rotation may be from about 7500 rpm to about 10,000 rpm. In addition, in the step of pressing the outlet port 50 against the inflator body 11, the outlet port 50 may be pressed against the inflator body 11 at a pressure of from about 900 psi–1200 psi. In addition, in methods of the invention, the step of holding both of the tubular structures 50, 11 in place to allow the weld 132 to cure may have a duration of at least about 0.5 seconds.

Weld energy and force may alternatively be used to describe the parameters needed during the step of rotating one of the components 50, 11 about the axis of symmetry 70 of the outlet port 50. Specifically, in some situations, it may be advantageous to express the speeds of rotation and the pressures used in the invention in terms of weld energy and weld force. The speeds of rotation cited above may be converted to energy measurements according to the following equation:

$$Energy = 0.0001102 \, (rpm)^2$$

Thus, the broad range of suitable speeds of rotation noted above may be expressed as from about 4,655.95 foot-pounds of energy to about 13,334 foot-pounds.

In addition, the pressures noted above may be converted to measures of force according to the following equation:

$$Pressure(psi) \times (4.91 \, in^2) = Force$$

Thus, the broad range of pressures used above may be expressed as from about 4,419 to about 5892.

In alternate methods of the invention, the weld 132 is formed in two distinct steps: a step of rotation at a first rate and pressure; and a step of rotation at a decreased rate and an increased pressure. In some such methods, the step of rotation at a first rate and pressure includes rotating one of the tubular structures 50, 11 about the axis of symmetry 70 at from about 6350 rpm to about 9925 rpm. Alternatively, in such methods, the step of rotation at a first rate and pressure includes rotating one of the tubular structures 50, 11 about the axis of symmetry 70 at from about 7350 rpm to about 8925 rpm. In addition, during the step of rotation at a first rate and pressure, the step of pressing the outlet port 50 against the inflator body 11 includes pressing the outlet port 50 against the inflator body 11 at from about 900 psi–1200 psi.

In those methods including a step of rotation at a decreased rate and at an increased pressure, the step of pressing the outlet port 50 against the inflator body 11 is followed by the steps of reducing the rotation rate of the tubular structure being rotated and increasing the pressure of the outlet port 50 against the inflator body 11. Specifically, the rotation rate of the tubular structure 50, 11 being rotated may be reduced to from about 6000 rpm to about 9500 rpm. Alternatively, the rotation rate of the tubular structure 50, 11 being rotated may be reduced to from about 7000 rpm to about 8500 rpm. In addition, the pressure of the outlet port 50 against the inflator body 11 may be increased to from about 1000 psi to about 1200 psi.

In yet another embodiment of the invention, a method of friction welding is provided for joining a tubular structure with a conical contact surface to an orifice placed in the side of a second tubular structure. In this method of the invention, the second tubular structure has a flattened region into which the hole is placed. This method is illustrated with reference to an airbag inflator constructed using the method in FIG. 3.

Figure 3:
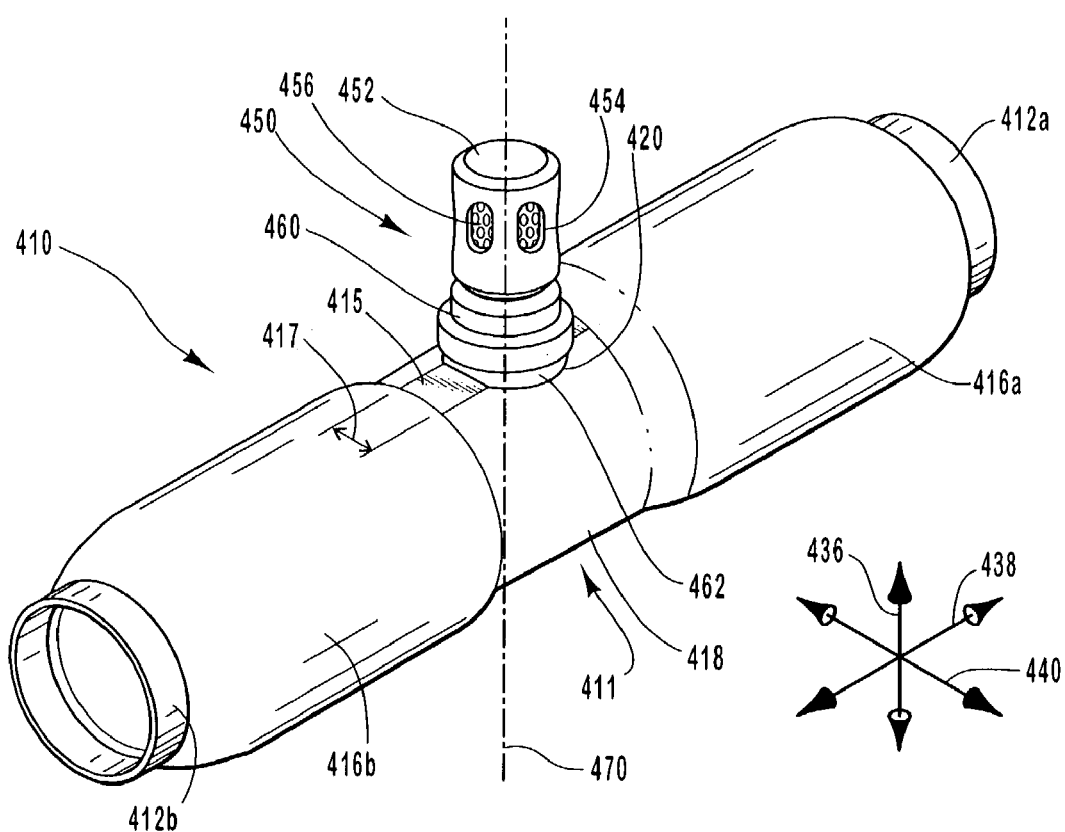
FIG. 3 is a perspective view of another embodiment of an airbag inflator assembled using the friction welding methods of the invention.

Referring now to FIG. 3, a perspective view of an airbag inflator 410 constructed according to this method is shown. The airbag inflator 410 includes an outlet port 450 welded to an inflator body 411. As above, the inflator body 411 includes gas chambers 416a, 416b that are interconnected by a central chamber 418 and capped by end caps 412a, 412b. In this embodiment of the method of the invention, the generally rounded inflator body 411 includes a flattened region 415. In this method of the invention, the flattened region 415 has a width 417 which may be at least as large as, or equal to, a diameter of the outlet port 450, especially a diameter at the level at which the flattened region 415 contacts the outlet port 450. Within the scope of this method, the width 417 of the flattened region 415 is at least as large as or equal to the diameter of the outlet port 450, and may be smaller than this diameter, ranging down to 0 in width, at which this method becomes equivalent to the methods of the invention described above.

In this embodiment of the method of the invention, the orifice 420 of the inflator body 411 is not elliptical in shape, as in previous methods of the invention. Instead, on those portions of the inflator body 411 which are rounded as above, the orifice 420 is generally elliptical in shape. In the flattened region 415 of the inflator body 411, however, the orifice 420 has a rounded shape. Thus, in embodiments of this method in which the width 417 of the flattened region 415 is equal to or larger than the diameter of the outlet port 450, the orifice 420 has a round/circular geometry. If, however, the width of the flattened region 415 is smaller than the diameter of the outlet port 450, then the orifice 420 will have a constant radius, and thus a rounded shape along those regions where the orifice 420 was on the flattened region 415, and an elliptical shape on the other regions.

Thus, the present invention provides methods of welding a first tubular component into the side of a second tubular component. In the method, the first tubular structure is provided with a cone-shaped contact surface, and the second tubular component is provided with an elliptical orifice for receiving the cone-shaped contact surface. The components are friction welded together by rotating one of the components about an axis of symmetry of the first tubular structure while pressing both structures together.

One specific method of the invention is a method of welding an outlet port into an airbag inflator body to form an airbag inflator. In this method, the outlet port generally includes an axis of symmetry about which it may be rotated. The outlet port further includes a conical contact face. The inflator body includes an elliptical outlet orifice sized to receive the conical contact face of the outlet port. According to the method of the invention, the conical contact face of the outlet port is first positioned by inserting it into the elliptical outlet orifice of the inflator body. Following this alignment step, one of the components is rotated about the axis of symmetry of the outlet port while the two components are pressed together. The speed of rotation and the pressure are selected to provide enough energy to the interface of the two components to soften the materials of the components and form a weld.

The methods of the invention provide a means for successfully joining a conical member to the side of another tubular member using friction welding. In specific applications, the invention provides methods for friction-welding an outlet port into the inflator body of an airbag inflator. This helps to reduce the cost of assembling such airbag inflators, while allowing ease and speed of assembly.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method of joining a first tubular structure to a second tubular structure comprising the steps of:
   providing a first tubular structure having a first axis of symmetry and a conical contact face;
   providing a second tubular structure having an elliptical contact orifice;
   placing the conical contact face of the first tubular structure within an elliptical contact orifice;
   rotating one of the tubular structures about the first axis of symmetry; and
   pressing the first tubular structure against the second tubular structure to generate friction and heat sufficient to form a weld.

2. The method of claim 1, wherein the conical contact face of the first tubular structure is defined by an included angle.

3. The method of claim 2, wherein the included angle ranges from about 30° to about 90°.

4. The method of claim 2, wherein the included angle ranges from about 60° to about 90°.

5. The method of claim 2, wherein the conical contact face of the first tubular structure is defined by a first included angle and a second included angle.

6. The method of claim 5, wherein the first included angle is greater than the second included angle.

7. The method of claim 6, wherein the first included angle and the second included angle are from about 30° to about 110°.

8. The method of claim 5, wherein the first included angle is less than the second included angle.

9. The method of claim 8, wherein the first included angle and the second included angle are from about 30° to about 110°.

10. The method of claim 1, wherein the elliptical contact orifice is defined by a major diameter and a minor diameter.

11. The method of claim 10, wherein the major diameter and the minor diameter of the elliptical contact orifice of the second tubular structure are determined by projecting the first tubular structure against the side and end of the second tubular structure at the desired height of the first tubular structure.

12. The method of claim 1, wherein the contact orifice is positioned on a flattened region of the second tubular structure, thus producing a contact orifice that has a uniform radius on the flattened regions of the second tubular structure and a variable radius on the remaining regions of the second tubular structure.

13. The method of claim 12, wherein the flattened region of the second tubular structure has a width less than or equal to a diameter of the conical contact face of the first tubular structure.

14. The method of claim 13, wherein the configuration of the contact orifice of the second tubular structure is determined by projecting the first tubular structure against the side and end of the second tubular structure at the desired height of the first tubular structure.

15. The method of claim 1, wherein the step of rotating one of the tubular structures about the first axis of symmetry includes rotating the first tubular structure about the first axis of symmetry.

16. The method of claim 15, wherein the step of rotating one of the tubular structures about the first axis of symmetry further includes retaining the second tubular structure in a fixed position.

17. The method of claim 1, wherein the step of rotating one of the tubular structures about the first axis of symmetry includes rotating the tubular structure at from about 6500 rpm to about 11,000 rpm.

18. The method of claim 17, wherein the step of rotating one of the tubular structures about the first axis of symmetry includes rotating the tubular structure at from about 7500 rpm to about 10,000 rpm.

19. The method of claim 17, wherein the step of pressing the first tubular structure against the second tubular structure includes pressing the first tubular structure against the second tubular structure at from about 900 psi–1200 psi.

20. The method of claim 1, further comprising the step of holding both of the tubular structures in place to allow the weld to cure after pressing the first tubular structure against the second tubular structure.

21. The method of claim 20, wherein the step of holding both of the tubular structures in place to allow the weld to cure has a duration of at least about 0.5 seconds.

22. The method of claim 1, wherein the step of rotating one of the tubular structures about the first axis of symmetry includes rotating the tubular structure at from about 6350 rpm to about 9925 rpm.

23. The method of claim 22, wherein the step of rotating one of the tubular structures about the first axis of symmetry includes rotating the tubular structure at from about 7350 rpm to about 8925 rpm.

24. The method of claim 22, wherein the step of pressing the first tubular structure against the second tubular structure includes pressing the first tubular structure against the second tubular structure at from about 900 psi–1200 psi.

25. The method of claim 22, wherein the step of pressing the first tubular structure against the second tubular structure is followed by the steps of reducing the rotation rate of the tubular structure being rotated and increasing the pressure of the first tubular structure against the second tubular structure.

26. The method of claim 25, wherein the rotation rate of the tubular structure being rotated is reduced to from about 6000 rpm to about 9500 rpm.

27. The method of claim 26, wherein the rotation rate of the tubular structure being rotated is reduced to from about 7000 rpm to about 8500 rpm.

28. The method of claim 25, wherein the pressure of the first tubular structure against the second tubular structure is increased to from about 1000 psi to about 1200 psi.

29. A method of fusing a conical member into a side of a tubular member comprising the steps of:
providing a tubular member having an axis of symmetry and an elliptical orifice, the elliptical orifice having a major diameter and a minor diameter;
providing a conical member to be joined to the tubular member, the conical member having a central axis of symmetry and a conical contact region with a diameter ranging in size from an upper diameter at least as large as the major diameter of the elliptical hole to a lower diameter at least as large as the minor diameter of the elliptical aperture;
rotating the conical member at a predetermined rate; and
directing the rotating conical member against the elliptical orifice of the tubular member with a predetermined pressure to form a weld.

30. The method of claim 29, wherein the tubular member is held in position while the conical member is rotated about its axis of symmetry.

31. The method of claim 29, wherein the step of rotating the conical member at a predetermined rate includes rotating the conical member at from about 6500 rpm to about 11,000 rpm.

32. The method of claim 31, wherein the step of rotating the conical member at a predetermined rate includes rotating the conical member at from about 7500 rpm to about 10,000 rpm.

33. The method of claim 29, wherein the step of directing the rotating conical member against the elliptical aperture of the tubular member with a predetermined pressure is performed at a pressure of from about 900 psi–1200 psi.

34. The method of claim 29, wherein following the step of directing the rotating conical member against the elliptical aperture of the tubular member, the conical member and the tubular member are held in a fixed relationship for a period of at least about 0.5 seconds.

35. The method of claim 29, wherein the step of rotating the conical member at a predetermined rate includes rotating the conical member at from about 6350 rpm to about 9925 rpm.

36. The method of claim 35, wherein the step of rotating the conical member at a predetermined rate includes rotating the tubular structure at from about 7350 rpm to about 8925 rpm.

37. The method of claim 29, wherein the step of directing the rotating conical member against the elliptical aperture of the tubular member with a predetermined pressure includes directing the rotating conical member against the elliptical aperture of the tubular member at a pressure of from about 900 psi–1200 psi.

38. The method of claim 29, wherein the step of directing the rotating conical member against the elliptical aperture of the tubular member with a predetermined pressure is followed by the additional steps of reducing the rotation rate of the conical member being rotated and increasing the pressure of the conical member against the elliptical aperture of the tubular member.

39. The method of claim 38, wherein the rotation rate of the conical member being rotated is reduced to from about 6000 rpm to about 9500 rpm.

40. The method of claim 39, wherein the rotation rate of the conical member being rotated is reduced to from about 7000 rpm to about 8500 rpm.

41. The method of claim 38, wherein the pressure of the conical member against the elliptical aperture of the tubular member is increased to from about 1000 psi to about 1200 psi.

42. A method of fusing an outlet port into the sidewall of an airbag inflator comprising the steps of:
providing an airbag inflator comprising substantially tubular sidewalls and an axis of symmetry;
creating an elliptical orifice in the tubular sidewalls of the inflator;
providing an outlet port having an axis of symmetry and a conical contact face defined by an included angle and having a large diameter and a small diameter;
rotating the outlet port at a predetermined rate; and
directing the rotating outlet port against the elliptical orifice of the airbag inflator with a predetermined pressure to form a weld.

43. The method of claim 42, wherein the outlet port is rotated about its axis of symmetry.

44. The method of claim 42, wherein the airbag inflator is held in position while the outlet port is rotated about its axis of symmetry.

45. The method of claim 42, wherein the step of rotating the outlet port at a predetermined rate includes rotating the outlet port at a rate of from about 6500 rpm to about 11,000 rpm.

46. The method of claim 45, wherein the step of rotating the outlet port at a predetermined rate includes rotating the outlet port at a rate of from about 7500 rpm to about 10,000 rpm.

47. The method of claim 42, wherein the step of directing the rotating outlet port against the elliptical orifice of the airbag inflator with a predetermined pressure is performed at a pressure of from about 900 psi–1200 psi.

48. The method of claim 42, wherein the step of directing the rotating outlet port against the elliptical orifice is followed by the step of retaining the outlet port and the airbag inflator in a fixed relationship to allow adequate curing of the weld for a period of at least about 0.5 seconds.

49. The method of claim 42, wherein the step of rotating the outlet port at a predetermined rate includes rotating the outlet port at from about 6350 rpm to about 9925 rpm.

50. The method of claim 49, wherein the step of rotating the outlet port at a predetermined rate includes rotating the outlet port at from about 7350 rpm to about 8925 rpm.

51. The method of claim 42, wherein the step of directing the rotating outlet port against the elliptical orifice of the airbag inflator with a predetermined pressure includes directing the rotating outlet port against the elliptical orifice of the airbag inflator at a pressure of from about 900 psi–1200 psi.

52. The method of claim 42, wherein the step of directing the rotating outlet port against the elliptical orifice of the airbag inflator with a predetermined pressure is followed by the additional steps of reducing the rotation rate of the outlet port being rotated and increasing the pressure of the outlet port against the elliptical orifice of the airbag inflator.

53. The method of claim 52, wherein the rotation rate of the outlet port being rotated is reduced to from about 6000 rpm to about 9500 rpm.

54. The method of claim 53, wherein the rotation rate of the outlet port being rotated is reduced to from about 7000 rpm to about 8500 rpm.

55. The method of claim 52, wherein the pressure of the conical member against the elliptical aperture of the tubular member is increased to from about 1000 psi to about 1200 psi.

56. The method of claim 42, wherein the step of creating an elliptical orifice in the tubular sidewalls of the inflator is conducted using a method selected from the group consisting of: machining, punching and stamping.

* * * * *